Nov. 20, 1934.     E. M. D'AUBIGNE     1,981,782
COMPOSITE GEAR AND METHOD OF MAKING THE SAME
Filed Nov. 19, 1932     3 Sheets-Sheet 2
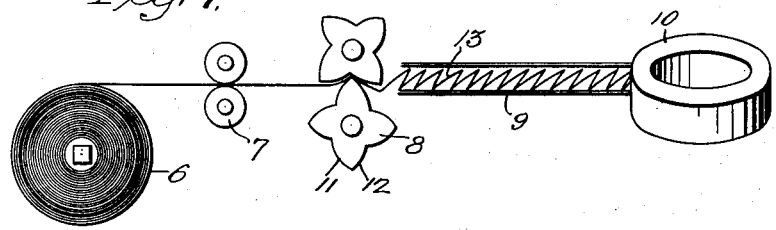
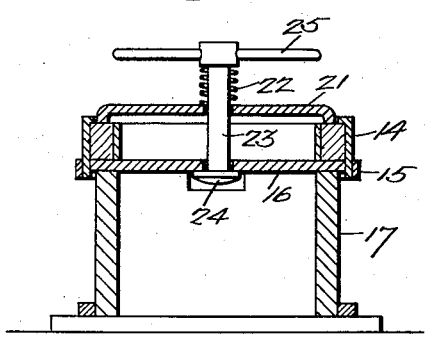
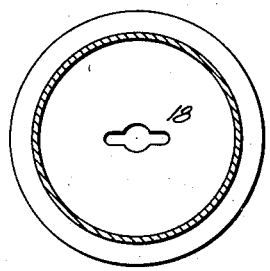

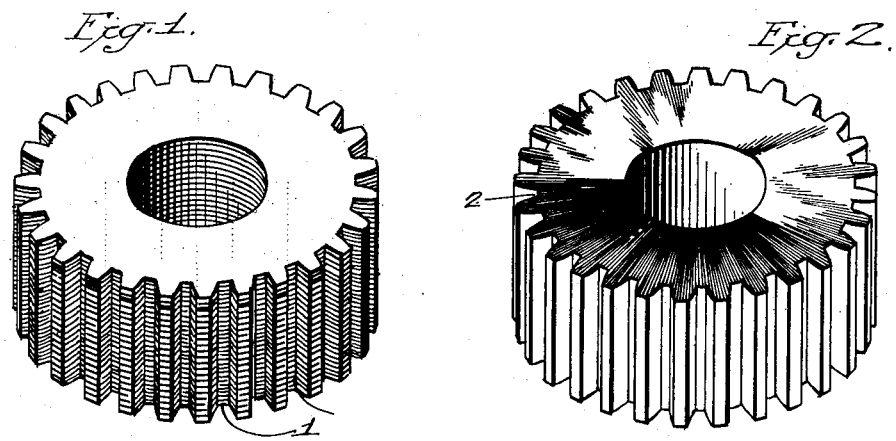
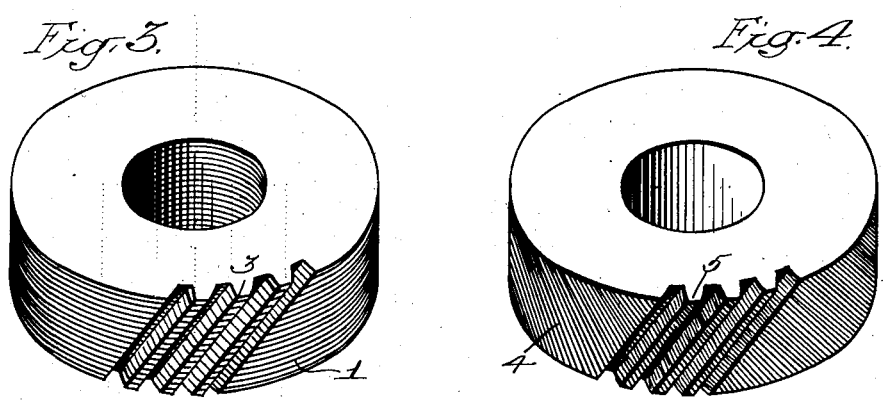
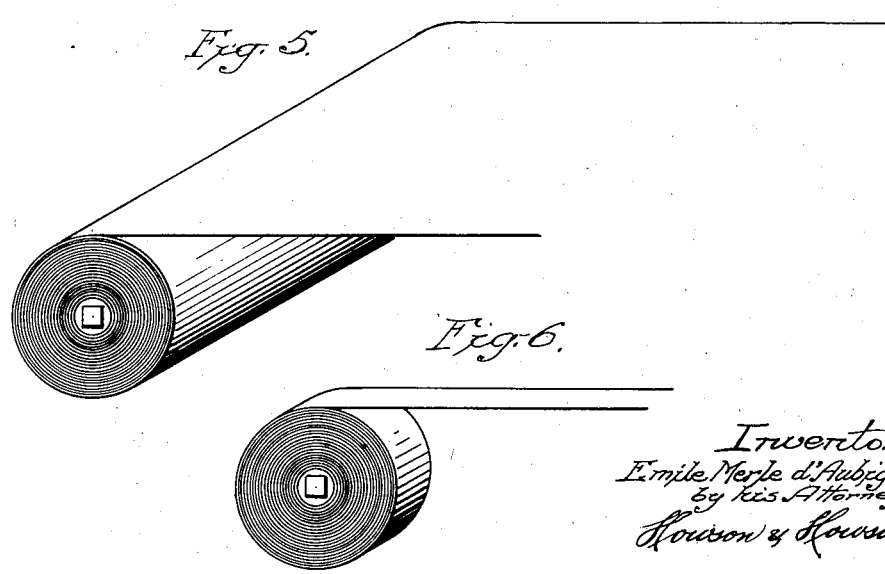

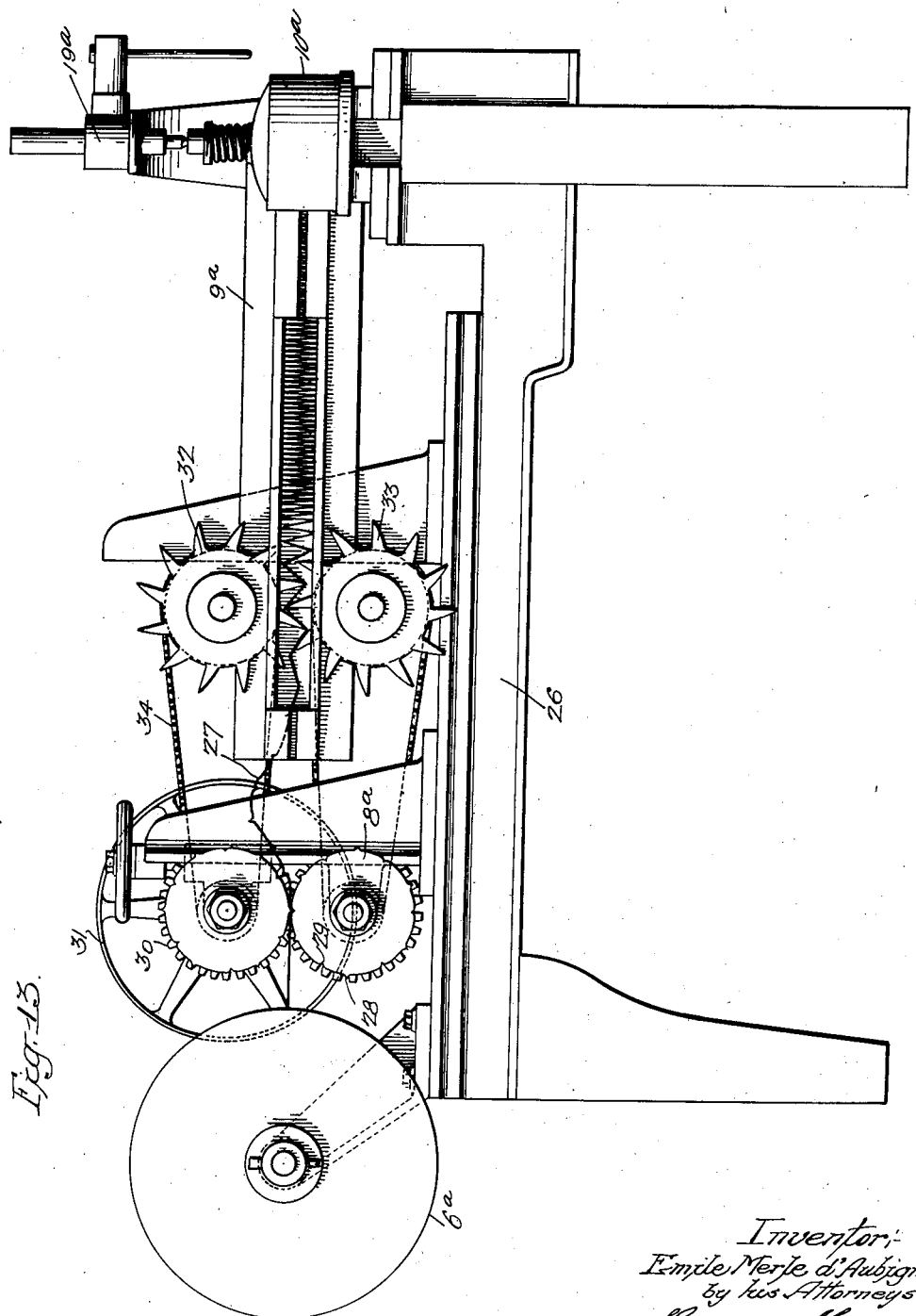

Patented Nov. 20, 1934

1,981,782

UNITED STATES PATENT OFFICE 1,981,782

COMPOSITE GEAR AND METHOD OF MAKING THE SAME

Emile Merle d'Aubigne, Neuilly Sur Seine, France, assignor to Continental-Diamond Fibre Company, Newark, Del., a corporation of Delaware Application November 19, 1932, Serial No. 643,519
In France November 24, 1931

11 Claims. (Cl. 154—2)

This invention relates to non-metallic gears and to methods and apparatus for making the same.

The principal object of the invention is to provide an improved non-metallic gear having maximum strength and resistance to wear. More specifically, the invention is directed to helical gears, although it is applicable to gears in general and to other devices, such as rollers, pulleys, etc.

Another object of the invention is to provide a novel and simple method of making the improved gear, which method may be practiced economically.

A further object of the invention is to provide novel aparatus for practicing the improved method and for forming the working body or rim portion of the improved gear.

Other objects will be apparent hereinafter. A full and clear understanding of the invention as exemplified by a preferred form thereof may be had from the following detailed description taken together with the accompanying drawings.

In the drawings:

Figs. 1 to 3 are perspective views illustrating prior gear constructions and their relative advantages and disadvantages;

Fig. 4 is a similar view illustrating the improved construction of the present invention as applied specifically to a helical gear;

Figs. 5 and 6 are perspective views showing the sheet material from which the gear rim may be made;

Fig. 7 is a diagrammatic illustration of the novel method and apparatus for forming the rim of my improved gear;

Figs. 8 to 10 are diagrammatic illustrations of the lamination positions during successive steps in the manufacture of the gear rim;

Fig. 11 is a sectional elevation of the device which is used to apply the desired pressure to the gear rim;

Fig. 12 is a sectional view along line 12—12 of Fig. 11; and

Fig. 13 is a side elevational view of a practical machine which has been used to practice the novel method and to form the working body or rim of the improved gear.

Non-metallic gears have heretofore been constructed of fibrous sheet material having a suitable binder associated therewith. Such gears have in many instances been made of fibrous sheet material such as canvas, paper, etc., impregnated with synthetic resin, preferably of the phenolic type. As is now well known, this particular form of binder exists in two stages, viz., an initial stage and a final stage. Fibrous material may be readily impregnated with a resinous binder in its initial stage in known manners and the binder may thereafter be converted to its final infusible and insoluble stage by means of heat and pressure. Although the present invention contemplates the construction of non-metallic gears from fibrous sheet material, such as canvas, impregnated with synthetic resin of the phenolic type, it is to be understood that the invention is not thus limited but may be practiced with any other suitable fibrous material having a suitable binder associated therewith.

It has heretofore been proposed to construct the rim portion of a gear by building up said portion of disk-like laminations of fibrous material and an associated binder, and thereafter cutting or machining the gear teeth about the periphery of the body portion. Such a gear is illustrated in Fig. 1 and it is to be noted that the laminations 1 are perpendicular to the flanks or working surfaces of the gear teeth. Such a gear is very strong and durable and, in fact, has maximum strength and durability by virtue of the perpendicular arrangement of the laminations with respect to the flanks of the teeth. This follows from the generally known fact that a laminated structure is stronger along a line or plane which is parallel to the planes of the respective laminations than it is along a line or plane at an angle to the planes of the laminations.

It has also been proposed to construct the rim portion of a non-metallic gear by radially arranging rectangular laminations of fibrous sheet material and an associated binder side by side in angular fashion, as illustrated clearly in Fig. 2. In such case, the laminations 2 are disposed parallel to the flanks or working surfaces of the gear teeth. For the reason above mentioned, such a gear is obviously objectionable from the standpoint of strength and durability since the forces applied to the working surfaces of the gear teeth are at an angle and substantially perpendicular to the faces of the laminations. As a matter of fact, such a gear would seem to have minimum strength and resistance to wear.

If a non-metallic helical gear is made by either of the above-mentioned prior methods, maximum strength and durability is not obtained. For example, in Fig. 3, there is shown a gear working body constructed in the manner illustrated in Fig. 1, but in which helical teeth 3 have been cut or machined. Instead of the laminations being perpendicular to the flanks or working surfaces of the gear teeth, as in Fig. 1, they are now at an oblique angle to the flanks of the teeth and the strength and durability of the gear is consequently lessened.

In accordance with the present invention, I propose to construct the working body or rim portion of a gear in a manner which is generally similar to that illustrated in Fig. 2, but which differs therefrom by having the radially disposed laminations in recumbent positions, or in other words, disposed at acute angles with respect to the gear sides or faces. Such construction, as applied to a helical gear, is illustrated in Fig. 4, wherein the recumbent or angularly inclined laminations are shown at 4 and the gear teeth at 5. By properly designing the gear, the laminations may be inclined so as to be substantially at right angles or perpendicular to the flanks or working surfaces of the gear teeth. This construction gives maximum strength and durability for the reasons above discussed.

In the construction of my improved gear, I preferably use canvas in the form of a roll as illustrated clearly in Fig. 5. This fibrous material is passed through a suitable impregnating machine in which impregnation of the material with the resinous binder is performed. The material is then cut into strips suitable for the desired purpose and may be wound in rolls as illustrated in Fig. 6.

In Fig. 7, there is illustrated diagrammatically the method and apparatus for forming the gear working body in accordance with the teachings of the invention. A roll of binder treated fibrous sheet material is shown at 6 and the strip of material passes through feed rolls 7. A pair of forming or bending gears 8 serve to fold the strip material in the desired fashion to form the successive laminations and these laminations are passed through a guide 9 which extends tangentially from an annular receptacle 10. The teeth of gears 8 are formed with long and short sides 11 and 12, respectively. Due to this peculiar formation of the folding gears, the successive folds or laminations 13, which pass through guide 9, are alternatively long and short. This causes the laminations to assume a slightly recumbent position. In the illustration of Fig. 7, the unevenness of the successive folds or laminations and the recumbent positions thereof are exaggerated in order to more clearly bring out this feature of the invention, it being understood that the illustration is merely diagrammatic. In actual practice, the unevenness of the folds is less pronounced and the recumbent positions of the laminations are not so great as will be seen later.

Fig. 8 is an enlarged exaggerated view illustrating the recumbent laminations as they pass through guide 9. As the laminations near receptacle 10 and annularly arrange themselves therein, they are compressed and take the position illustrated diagrammatically in Fig. 9. When subjected to the compressing and molding operation described hereinafter, the laminations assume a more recumbent position as illustrated diagrammatically and exaggerated in Fig. 10. Again, it is to be borne in mind that the illustrations of Figs. 8 to 10 are exaggerated diagrammatic illustrations which are intended only to more clearly illustrate the invention.

Receptacle 10 in practice preferably takes the form illustrated in Fig. 11 and it will be noted that this receptacle comprises an annular frame 14 which is reinforced by ring 15. The frame is supported by a plate 16 which, in turn, rests upon support 17. In the center of plate 16, there is provided a hole having diametrically opposed side recesses 18 (see Fig. 12). The entire frame assembly or jig is axially aligned with an arbor press (not shown).

When the folded laminations fill the annular space within frame 14, the strip is cut. A second plate 21 is then placed on top of the laminated annular body, which plate is compressed by spring 22 surrounding shank 23. The shank extends through the assembly and carries at its lower end a cross latch 24 that is adapted to cooperate with the central opening of plate 16. The action of the arbor press forces plate 21 against the laminated body and compresses the same against plate 16. The laminations take, under the exerted pressure, a recumbent position as illustrated in Fig. 10 and above mentioned. When the desired compression is obtained, the cross latch 24 is released by rotating wrench 25 carried at the upper end of shank 23. The arbor press is released and the complete jig, including the enclosed laminated structure, is removed and placed in an oven. The laminations adhere to one another and the preformed rim portion of the gear is thus obtained. After cooling the jig is removed and may be used for successive molding operations. The preformed rim portion is then placed in a mold with the material to be employed to form the web and hub for example, small pieces of resin-impregnated scrap material, resin-impregnated laminated material, or a metal blank, and the assembled gear molded under heat and pressure in the well known manner to obtain a unitary article in which the resin is in its final, infusible, insoluble stage. It may now be machined to provide the desired gear teeth.

Although the manufacture of the improved gear may be advantageously carried out by means of the method and apparatus above described, it is to be understood that the gear rim may be made by any other suitable process or method so long as the laminations are annularly arranged as above described. For example, the gear rim may be constructed of scrap material, in which case, small pieces of scrap cut to the desired size of the laminations may be placed in the annular receptacle to build up the gear rim. It is also to be noted that although the invention specifically contemplates the arrangement of the laminations in recumbent position, as illustrated and described, the apparatus disclosed herein may be used in slightly modified form to provide evenly formed laminations in the manufacture of a gear such as is illustrated in Fig. 2.

In Fig. 13, there is illustrated a practical machine which has been used to manufacture gears in accordance with the teachings of the invention. This machine comprises the supporting framework 26 and the elements carried thereby and described more particularly hereinafter. In this instance, the annular receptacle is shown at 10a and has tangentially associated therewith the guide 9a through which the folds or laminations move. The rolled or wound strip material is shown at 6a. A pair of folding wheels 8a correspond to gears 8 of Fig. 7 and are adapted to form successive uneven folds in the strip material 27. The working surfaces of wheels 8a are provided with alternative projections and depressions 28 and 29, respectively, which are unevenly spaced so as to form alternative long and short folds or laminations in the strip material. Wheels 8a are driven at the desired constant speed by means of intermeshed gears 30, which, in turn, are driven from a suitable pulley wheel 31 connected to a driving source (not shown).

A pair of pusher wheels 32 are arranged for cooperation with each other to push the successive folds or laminations of the strip material through guide 9a. These wheels are provided with intermeshing teeth 33 which move in slots provided in guide 9a, as illustrated. The pusher wheels are preferably connected by means of chains 34 to wheels 8a and gears 30 so as to be driven thereby.

In operation, the successive folds or laminations are pushed along guide 9a and assume a slightly recumbent position due to the uneven folding of the strip as above mentioned. The laminations pass into receptacle 10a and are annularly arranged therein as above described. In this illustration, the uneven folding of the strip and the slightly recumbent positions of the laminations are much less pronounced than in the previously described illustrations, it being remembered that the illustration of Fig. 13 is that of a practical machine.

After the desired laminated annular body or rim has been formed, it is axially compressed by means of the arbor press 19a in the same manner as previously described. The compressed rim is then assembled with the web and subjected to the heating and molding process, as above mentioned, after which the gear teeth are cut or machined.

Although the apparatus of Fig. 13 is particularly adapted to the formation of the gear rim in the specific manner contemplated, it will be apparent that this apparatus may be slightly modified to form the rim with upright radially disposed laminations as illustrated in Fig. 2. Although the invention is particularly directed to the formation of helical gears, such as illustrated in Fig. 4, any of the features forming a part of the invention may be used in the manufacture of modified forms of gears, or other devices, without departing from the spirit of the invention in its generic scope. Although preferred embodiments of the improved gear, the method of making the same, and the apparatus for performing the method have been disclosed and described herein for the purpose of illustration, it is to be understood that many modifications and changes may be made without departing from the spirit of the invention.

I claim:

1. A gear having a non-metallic rim portion of fibrous sheet material and a binder, said sheet material comprising annularly arranged recumbent rectangular laminations.

2. A non-metallic rim for gears and the like formed of rectangular laminations of fibrous sheet material and a binder, said laminations being arranged annularly side by side in recumbent position and extending from one face of said rim to the other face thereof.

3. A gear having a non-metallic rim portion of fibrous sheet material and a binder, said sheet material comprising laminations disposed at acute angles with respect to the gear sides and extending from one face of said rim portion to the other face thereof.

4. A gear having a non-metallic rim portion of fibrous sheet material and a binder, said sheet material comprising a strip folded and arranged to provide annularly disposed recumbent rectangular laminations.

5. A gear having a non-metallic rim portion of fibrous sheet material and a binder, said sheet material comprising a strip folded unevenly and arranged to provide annularly disposed recumbent laminations extending from one face of said rim portion to the other face thereof.

6. A helical gear having a non-metallic rim portion formed of laminations of fibrous sheet material associated with a binder, said laminations being substantially perpendicular to the flanks or working surfaces of the helical teeth of the gear.

7. A helical gear having a non-metallic rim portion of fibrous sheet material and a binder, said sheet material comprising annularly arranged recumbent laminations extending from one face of said rim portion to the other face thereof, said laminations being disposed substantially perpendicular to the flanks of the gear teeth.

8. A method of forming a non-metallic rim portion of a gear, which comprises annularly arranging a plurality of laminations of fibrous sheet material associated with a binder side by side in slightly recumbent position to form an annulus with the laminations extending from one face thereof to the other face, and compressing the assembled annulus from opposite sides thereof while heating the same, whereby said laminations are caused to assume a desired recumbent position.

9. A method of forming a non-metallic rim portion of a gear, which comprises folding a strip of fibrous sheet material associated with a binder unevenly to form laminations, annularly arranging the laminations side by side to form an annulus with the laminations extending from one face thereof to the other face, the uneven folds causing the laminations to assume a slightly recumbent position, and compressing the assembled annulus from opposite sides thereof while heating the same, whereby said laminations are caused to assume a desired recumbent position.

10. A method of forming a non-metallic rim portion of a gear, which comprises folding a strip of fibrous sheet material associated with a binder unevenly to form folds or laminations, pushing said laminations through a guide into an annular receptacle to annularly arrange the laminations side by side with the laminations thus formed extending from one face of annulus to the other face thereof, the uneven folds causing the laminations to assume a slightly recumbent position, and compressing the assembled annulus from opposite sides thereof while heating the same, whereby said laminations are caused to assume a desired recumbent position.

11. A method of forming a non-metallic rim portion of a helical gear, which comprises forming said portion of laminations of fibrous sheet material associated with a binder with the laminations arranged substantially perpendicular to predetermined lines of cut of the helical gear teeth, and forming the teeth along said lines, whereby the laminations are substantially perpendicular to the flanks or working surfaces of the teeth.

EMILE MERLE D'AUBIGNE.